United States Patent Office 3,502,762
Patented Mar. 24, 1970

3,502,762
METHOD OF MAKING POLYIMIDE FILM
James R. Haller, St. Paul, Minn., assignor to Minnesota Mining and Manufacturing Company, St. Paul, Minn., a corporation of Delaware
No Drawing. Filed Jan. 24, 1967, Ser. No. 611,261
Int. Cl. B29c 25/00; D01f 7/04, 7/06
U.S. Cl. 264—204          6 Claims

ABSTRACT OF THE DISCLOSURE

Polyimide films of improved strength and toughness are obtained by gelling a sheeted solution of polyamide-acid and permitting the resultant solvent-swollen polyimide film to shrink a controlled amount during solvent removal. The films have particular utility in electrical insulation, e.g., as the backings for normally tacky and pressure-sensitive adhesive tape.

BACKGROUND OF THE INVENTION

Commercially available polyimides are characterized by a recurring unit having the structural formula:

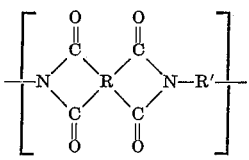

wherein R is a tetravalent radical containing at least 6 carbon atoms in a ring, the ring being characterized by benzenoid unsaturation, the four carbonyl groups being attached to separate carbon atoms and each pair of carbonyl groups being attached to adjacent carbon atoms in a 6-membered benzenoid ring of the R radical; and wherein R' is a divalent organic radical containing at least two carbon atoms. Such polyimides are prepared by reacting (1) at least one organic diamine having the structural formula:

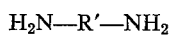

wherein R' is a divalent radical containing at least two carbon atoms, the two amino groups of the diamine each attached to separate carbon atoms of the divalent radical, and (2) at least one tetracarboxylic acid dianhydride having the structural formula:

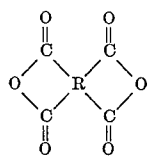

wherein R is a tetravalent radical containing at least two carbon atoms, no more than two carbonyl groups of the dianhydride being attached to any one carbon atom of the tetravalent radical. The reaction is carried out in an organic solvent for at least one of the reactants, preferably under anhydrous conditions, for a time and at a temperature below 175° C. sufficient to form a polyamide-acid. The polyamide-acid is then converted to a polyimide, either by heat alone or by treatment with an acid anhydride, preferably in the presence of a tertiary amine catalyst.

Because of the generally intractable nature of most polyimides, it is conventional to form the polyamide-acid composition into the film or other ultimate shape which the polyimide is to assume, dehydrate with heat and/or organic dehydrating agents to convert the polyamide-acid to a solvent-swollen polyimide, and remove the solvent. Suitable processes are set forth with considerable detail (including reactants for forming polyamide-acids, anhydrides for dehydrating and gelling the polyamide-acid solution, and various tertiary amine catalysts) in U.S. Patents Nos. 3,179,614 and 3,179,630–3,179,634, inclusive. The disclosure of these patents is incorporated herein by reference, but, to point up the present invention, will not be repeated in the present description.

Because the polyamide-acid solutions just discussed typically contain on the order of 10–15% solids, the gelled polyimide film which results by heating and/or chemically dehydrating the polyamide-acid solution contains an extremely high percentage of solvent, e.g., 80%. As further heating is carried out in order to eliminate this solvent and obtain the polyimide film per se, a great deal of shrinkage normally occurs. Such shrinkage has been heretofore considered undesirable, since a film allowed to shrink uncontrollably is irregular in thickness, wavy, and possesses unpredictable tensile and ultimate elongation characteristics. Accordingly, patents disclosing the manufacture of polyimide film have uniformly specified that solvent is removed from the gelled polyimide film by gradually heating it "under restraint," thereby preventing any shrinkage whatsoever from occurring. It would be reasonable to assume that the prevention of shrinkage during solvent evaporation would be tantamount to orienting the solvent-free film, thereby offering further reason for the use of "restraint."

Although polyimide films prepared in accordance with the preceding paragraph are uniform in thickness, strong, smooth, heat-resistant, and have excellent electrical characteristics, their application in the electrical industry is seriously restricted by the fact that they are hard to conform to wires or other electrical conductors about which they might be commonly wrapped. When a conductor is wrapped with such polyimide films, the flexing which may occur as a wire is bent during installation or as temperature changes expand or contract the conductor, frequently cracks and breaks the film, thereby destroying the extremely important electrical characteristics which it was intended to provide.

SUMMARY

Like the polyimide films described above, the present invention provides a smooth, heat-resistant, electrically superior, dimensionally stable film of uniform caliper. Additionally, however, film made in accordance with the present invention is characterized by tensile strength and ultimate elongation which are both up to 50% or more greater than polyimide films made in the manner described above. As a result of this superiority, the films have greatly enhanced toughness, significantly improved conformability, and are capable of being wrapped around flexible electrical conductors and bent through sharp angles without rupture. The expansion and contraction which takes place as electrical equipment heats and cools does not cause film made in accordance with the present invention to fatigue or crack. As a result, the present invention provides a film which is far more versatile and useful than those made as taught by the prior art mentioned hereinabove.

In accordance with the present invention, polyamide-acid solution is gelled in conventional manner. Thereafter, however, the film is handled under carefully controlled conditions, being permitted to shrink at least about 10% but less than it would shrink if totally unrestrained (generally less than 50% and preferably less than 40%) in mutually perpendicular directions in the plane of the film. (The greatest amount of shrinkage permissible in practicing the present invention appears to be related to the concentration of the polyamide-acid solution employed, as well as the comparative densities of the polyamide-acid and solvent.) Permitting shrinkage to occur in this manner is directly contrary to the teachings and practices of prior art, where it has commonly been believed that it was necessary to prevent shrinkage in order to have a film which was smooth, free from waviness, and uniform in thickness. It is surprising that this simple modification so strikingly enhances the physical characteristics of the polyimide film.

DESCRIPTION OF PRESENTLY PREFERRED EMBODIMENTS

In order to facilitate understanding of the invention, but without in any way limiting the scope thereof, certain illustrative embodiments will now be set forth, all parts and percentages being by weight unless otherwise noted.

Example 1

Approximately equimolar amounts of pyromellitic dianhydride and 4,4'-diaminodiphenyl ether were mixed together in dimethyl acetamide solvent to form a 20% solution and reacted to yield a polyamide-acid [poly bis(4-aminophenyl)ether pyromellitamide]. Dimethyl acetamide was then added to reduce the concentration of polymer solids to 15%. The solution viscosity, measured using a Brookfield viscometer with a No. 4 spindle, was found to be 19,500 centipoises. The inherent viscosity [1] measured at 25° C., was found to be approximately 0.95.

A control film was prepared in the conventional manner of the prior art as follows: To 30 grams of the polyamide-acid solution (containing 4.5 grams of polyamide-acid, or 0.0216 carboxyl equivalent) was added 0.87 ml. (0.0108 mole) of pyridine and 2.11 ml. (0.0216 mole) of acetic anhydride. After mixing thoroughly and removing entrapped air under a vacuum, the mixture was cast into a 0.025 inch thick wet film on a glass plate, which was then immediately placed into a forced air oven heated to 176° F. After 20 minutes the film was found to be firm enough to handle, and was removed from the glass plate and placed between stainless steel frames to prevent any shrinkage from occurring. The framed film was returned to the oven, and the temperature raised slowly to 572° F. After removal from the oven the film was found to be brittle, having an ultimate elongation at break of 21%.

A film was prepared from the same polymer solution and in the same manner as the control film but following the teachings of the present invention. When the film was removed from the glass plate, it was placed between layers of cheesecloth and exposed to room temperature conditions for 16 hours and then to a 27-inch Hg vacuum for 4 hours, decreasing the planar dimensions by 27.5%. After then being placed between the stainless steel frames and heated in the same way as the control, the film had an ultimate elongation of 51.5%.

Example 2

A commercial poly bis(4-aminophenyl) ether pyromellitamide polyamide-acid solution ("RC-675," available from E. I. du Pont de Nemours & Co.) was obtained, consisting of a 16.5% solids solution in a mixture of N-methyl-2-pyrrolidone and dimethyl acetamide, the solution viscosity being on the order of 6,000-8,000 cps. To 50 grams of the solution (0.039 carboxyl equivalent) was added 3.74 ml. of 97% acetic anhydride (0.039 mole) and 1.6 ml. pyridine (0.0199 mole), approximately corresponding to 1.0 and 0.5 mole of acetic anhydride and pyridine respectively per carboxyl equivalent of poly-

---

[1] Inherent viscosity = $\dfrac{\text{Natural logarithm } \frac{\text{viscosity of solution}}{\text{viscosity of solvent}}}{C}$ where C is the concentration expressed in grams of polymer per 100 ml. of solution. Inherent viscosity measurements were made at 0.5% using dimethyl acetamide as solvent.

amide-acid. After thoroughly mixing and thereafter degassing in a vacuum, the clear solution was coated on a clean glass plate. After gellation, the film was removed from the plate and divided into halves, one of which was immediately clamped between stainless steel frames to prevent shrinkage in the planar direction. The other half was allowed to shrink in the planar direction to dimensions which were 77% of the original dimensions of the sample, and then clamped between stainless steel frames to prevent further shrinkage. Both restrained films were then placed in a forced air oven at 200° F., and the temperature allowed to increase to 572° F. at a slow rate, remaining at 572° F. for one hour. When removed from the oven, the film which had been allowed to shrink was found to be strong and flexible, while the other film was found to be very brittle and could not be creased without breaking.

Example 3

This example describes a continuous process for producing polyimide film in accordance with this invention. A polyamide-acid solution was prepared by mixing into dimethyl acetamide solvent approximately equimolar amounts of pyromellitic dianhydride and 4,4'-diaminodiphenyl ether. The polymer solids content of the solution was adjusted to 10%, the solution viscosity being 160,000 cps. (Brookfield viscometer, No. 4 spindle), and the inherent viscosity was found to be 2.84.

A metered stream of polyamide-acid solution was pumped into a mixer, where it was blended with a second metered stream of acetic anhydride, pyridine, and dimethyl acetamide, the volumetric ratio of the last three compounds being 251:139:510. The volumetric ratio of the two streams entering the mixer was adjusted to provide 1.0 and 1.5 moles respectively of pyridine and acetic anhydride per carboxyl equivalent of polyamide-acid.

The thoroughly mixed solution was pumped into a sheeting die, from which it emerged as a fluid film having a thickness of 0.020 inch and was extruded on a rotating steel casting roll heated to approximately 150° F. The casting roll was driven at about 8 surface inches per minute, the film gelling after 2½ minutes, exuding liquid, and separating from the surface of the roll. The gelled film was then stripped from the casting roll and passed around a stack of 7 hot cans, alternating the side of the film which contacted succeeding cans. The temperature of the first hot can was maintained at approximately 150° F., the temperature of succeeding cans being increasingly higher until the last can, which was maintained at 215° F. The film was then collected on a winder roll, the peripheral speed of which was kept identical to that of the casting roll, preventing any machine direction shrinkage but permitting the film to shrink 30% in its cross direction. The entire thread up length of the equipment just described, from casting roll to winder, was 16.3 feet. As wound up, the film contained 16.2% solvent. The film was then restrained, e.g., in a tentering frame or equivalent structure, to prevent further shinkage, and heated to 600° F. in a forced air oven, remaining at that temperature for 15 minutes. The final film was 0.0023 in. thick. When measured on an Instron Tensile Tester at an extension rate of 20% per minute, it was found that the ultimate elongation was 60.5% in the machine direction and 90.8% in the cross direction.

Example 4

A 10% polyamide-acid solution in dimethyl acetamide was prepared as in Example 1, the solution viscosity being 120,000 cps. and the inherent viscosity 2.74. Using the equipment described in Example 3, a stream of the polyamide-acid solution was then fed to a mixer, to which a 251:139:510 (volume ratio) acetic anhydride:pyridine:dimethyl acetamide solution was also supplied, the volumetric ratio of the two streams being adjusted to provide 1.0 mole of pyridine and 1.5 moles of acetic anhydride per carboxyl equivalent of polyamide-acid. The casting roll temperature was 165° F., and the hot cans ranged between 180° F. and 200° F. The linear speeds of the casting drum and the winder roll were adjusted to a ratio of 1:0.9, thereby permitting a 10% length reduction in the film, which was also allowed to shrink 23% in the cross direction. After restraining and heat curing the thus-shrunken film as described in Example 3, it was found that the thickness was 3.2 mils, and the machine direction tensile strength was 18,800 p.s.i. at an ultimate elongation of 54.1; the cross direction tensile strength was 19,900 p.s.i. at an ultimate elongation of 69.4%.

To simulate the flexibility and deformability required of film used in electrical industry, and to further demonstrate the usefulness of the present invention, a solid aluminum rod 18 inches long and ½ inch in diameter was bent to an angle of 180° around a 1-inch mandrel. The polyimide film of Example 4, made in accordance with this invention, was slit into a strip ½ inch wide and wrapped tightly around the bent aluminum rod. Upon close examination, the film was found to hug the curved surfaces of the rod smoothly, and no gaps or breaks in the film were observed. Another polyimide film, made in accordance with the prior art (i.e., being restrained to prevent shrinkage) was similarly wrapped on the bent aluminum rod as tightly as possible without breaking the film. The wrapping was found to contain gaps and wrinkles, because of the film's low conformability.

An 8-inch x ½-inch strip of film of this example was affixed to a solid aluminum rod 8 inches long and ½ inch in diameter by tightly clamping the ends of the film to the ends of the rod. The rod was then quickly bent to an angle of 100°, the film being on the outside of the bend. The film conformed easily to the bent rod and did not break. When the test was repeated using a heat-cured polyimide film which had been restrained from shrinkage during formation, the film broke when the rod had been bent to an angle of 55°.

A siloxane pressure-sensitive adhesive composition of the type disclosed in British Patent 998,232 was prepared and diluted with toluene to 40% solids content. (A suitable siloxane adhesive is commercially available from Dow-Corning Co. under the trade designation "C-280.") To the soution was then added 2.5% benzoyl peroxide, based on the adhesive solids. A 0.007-inch layer of the solution was coated on one surface of the film of this Example, the solvent evaporated in a forced air oven at 200° F., and the coated film heated 5 minutes at 350° F. to activate the peroxide catalyst. The resulting pressure-sensitive tape was provided with a polytetrafluoroethylene or coated creped paper liner, such as "Scotch" Release Liner RP–360, and wound on itself in roll form. The need for the liner may be obviated by priming one face to enhance adhesion (e.g. in accordance with Dutch patent application 65/12677, i.e., by treating the surface with an aqueous solution of (1) one or more polyalkylene-imines or polyalkylene polyamines and (2) one or more cation-bearing quaternary ammonium chlorides, and then hot-laminating, e.g., at 650° F. and 500 p.s.i., a fusible perfluorinated polymer film to one face. A suitable film is a 0.001-inch film of hexafluoropropylene:tetrafluoroethylene copolymer, commercially available from E. I. du Pont de Nemour & Co. under the trade designation "FEP Teflon." Alternatively, adhesion to the back of the polyimide film may be decreased by application of a suitable low-adhesion backsize. It will also be readily appreciated that less heat-resistant pressure-sensitive adhesives may be employed where the tape product will not be subjected to extremely high operating temperatures.

If desired, the laminate of polyimide film prepared in accordance with the present invention and perfluorinated copolymer may be used directly, the copolymer functioning as a thermoplastic adhesive. For example, the laminate may be cut into strips ½ inch wide, wound around a bundle of No. 18 AWG copper wires, and placed into a 650° F. forced air oven for 15 minutes, the perfluorinated copolymer fusing and bonding the laminate into a snug protective shealth.

Example 5

Example 4 was repeated, the sole difference being that shrinkages in the machine and cross directions were respectively regulated to 12% and 42%. The resultant film was 3.0 mls. thick, having ultimate elongations of 51.3% and 82.4% in the machine and cross directions respectively.

Example 6

Into a 5-gallon reaction kettle, containing 10.43 kg. of dimethyl acetamide was added, in two portions, a dry mixture consisting of 1001.3 grams of 4,4'-diamino-diphenyl ether (5.0065 gram moles) and 1611.2 grams of 3,3',4,4'-benzophenone tetracarboxylic dianhydride (5.0037 gram moles). The mixture was stirred for 2 hours, the reaction temperature being held between 60 and 80° F. After 16 hours of reaction, without stirring, the solution viscosity was found to be 92,000 cps., at which time additional dimethyl acetamide was added to reduce the solids content to 17.5% and the resulting solution viscosity to 30,000 cps. The inherent viscosity was 1.39.

Films of the viscous solution just described were cast on two glass plates, using a small doctor blade so that the thickness of the wet coating was about 0.020 inch. The plates were placed in a vacuum oven and heated at 30° C. for four hours under a reduced pressure of 0.1 mm. Hg. The plates were then immersed in a bath consisting of equal parts by volume of acetic anhydride and pyridine, the bath being maintained at 23° C. After immersion for 45 minutes, the solvent-swollen films were easily stripped from the glass plates. One film was immediately clamped between stainless steel frames to avoid dimensional change in the plane of the film; the other film was allowed to shrink in a 150° F. oven so that the dimensions in perpendicular directions in the plane of the films was reduced by 12%, after which the shrunken film was clamped in stainless steel frames. Both films were then heated to 600° F. in a forced air oven, where they remained for 15 minutes. The completely restrained film had an ultimate elongation of 15.3% in mutually perpendicular directions, while the shrunken film had an ultimate elongation of 21.6%. It will be noted that although the film of this Example 6 was permitted to shrink more than the film of Example 3, the ultimate elongation of the film of Example 6 is actually less than that of Example 4. Although the reason for this phenomenon is not known, it is believed that the steric configuration of the polymer of Example 6 inhibits smooth molecular slip.

It is believed clear that this invention is not limited to any particular polyimide, polyamide-acid system, anhydrides, or tertiary amine catalysts. Rather, the invention resides in forming films which yield new and unexpected properties, when compared to the prior art. Thus, the disclosure of the preceding examples is to be construed in the light of the teachings contained in the patents referred to under the heading "Background of the Invention."

The teachings of the invention may be further modified without departing from the spirit thereof to yield novel polyimide films which combine the features of extremely high tensile strength, toughness, and ultimate elongation with the well known dimensional stability, insulative value, and, heat resistance of conventionally prepared polyimide films. To illustrate, a given polyimide film may be permitted to shrink 40% during cure, thereby yielding a film having a tensile strength of 15,000 p.s.i. at an ultimate elongation of 150%; this film may then be heated to 600° F. and oriented, thereby reducing the ultimate elongation to 75% but increasing the tensile strength to 30,000 p.s.i. Such a film is far stronger and tougher than any made in accordance with the prior art referred to herein. Other variations of the technique just described will suggest themselves to those having ordinary skill in the art.

Having disclosed the invention, together with numerous illustrative examples thereof, what is claimed is as follows:

1. In the process of forming a polyimide film wherein a tetracarboxylic acid dianhydride is reacted with an organic diamine in a solvent to form a solution of polyamide-acid, said polyamide-acid 'in solution thereafter being coated in a thin layer on a temporary support and chemically dehydrated with an anhydride in the presence of a tertiary amine catalyst to form a solvent-swollen polyimide film, said film thereafter being heated to eliminate said solvent, the improvement for increasing ultimate elongation of the resulting film in at least one direction in the plane of the film which comprises:

permitting the solven-swollen polyamide film to shrink in said at least one direction an amount lying within a range of at least 10% but less than it would shrink if unrestrained, holding the controllably shrunken film at dimensions within said range, and heating until substantialy all the solvent is evaporated therefrom.

2. The invention of claim 1 wherein the solvent-swollen polyimide film is allowed to shrink at least 10% but less than 50% in mutually perpendicular directions in the plane of the film.

3. The invention of claim 1 wherein the solvent-free polyimide film is heated and oriented in said one direction an amount such that the ultimate dimension in said one direction is at least 10% less than if the solvent-swollen film had been totally restrained from shrinkage in said one direction.

4. The invention of claim 1 wherein the chemical dehydrating agent and tertiary amine catalyst are included in the polyamide-acid solution.

5. The method of claim 4 wherein the polyimide film is formed continuously by extruding the solution of polyamide-acid, dehydrating agent and catalyst on a casting roll heated to 130–170° F., maintaining the extruded solution in contact with said casting roll until liquid exudes, thereby causing the film to separate from said roll, removing the solvent-swollen polyimide film from said roll and passing it over a hot can stack, gradually increasing the temperature to at least about 200° F., whereby the liquid content of said film is reduced to about 15%, winding the resultant film on a winder roll which is driven at a slower speed than said casting roll, holding the dimensions of the film fixed, and heating to at least approximately 600° F. to remove the balance of the solvent.

6. The method of claim 4, wherein the film is thereafter postcured for approximately 1–5 minutes at approximately 750° F. thereby further improving the tensile properties.

References Cited
UNITED STATES PATENTS

| 2,603,838 | 7/1952 | Lowry et al. | 264—342 |
| 3,139,470 | 6/1964 | Prengle et al. | 264—289 |
| 3,179,632 | 4/1965 | Hendrix | 260—78 |

ROBERT F. WHITE, Primary Examiner

JEFFERY R. THURLOW, Assistant Examiner

U.S. Cl. X.R.

117—122, 138.8; 260—78; 264—210, 289, 342